(12) United States Patent
Ranganathan

(10) Patent No.: US 11,188,906 B2
(45) Date of Patent: Nov. 30, 2021

(54) FRAUD ALERTING USING MOBILE PHONE LOCATION

(71) Applicant: PAYPAL, INC., San Jose, CA (US)

(72) Inventor: Prashanth Ranganathan, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 65 days.

(21) Appl. No.: 16/533,513

(22) Filed: Aug. 6, 2019

(65) Prior Publication Data

US 2020/0143371 A1 May 7, 2020

Related U.S. Application Data

(63) Continuation of application No. 13/362,443, filed on Jan. 31, 2012, now Pat. No. 10,373,160.

(60) Provisional application No. 61/441,623, filed on Feb. 10, 2011.

(51) Int. Cl.
  *G06Q 20/40* (2012.01)
  *G06Q 20/32* (2012.01)
(52) U.S. Cl.
  CPC ......... *G06Q 20/40* (2013.01); *G06Q 20/3224* (2013.01)

(58) Field of Classification Search
  None
  See application file for complete search history.

(56) References Cited

U.S. PATENT DOCUMENTS

| | | | | |
|---|---|---|---|---|
| 8,295,898 | B2* | 10/2012 | Ashfield | G06Q 20/3229 455/575.6 |
| 8,509,734 | B1* | 8/2013 | Gupta | G06Q 20/04 455/406 |
| 8,521,131 | B1* | 8/2013 | Ramalingam | G06Q 30/0259 455/410 |
| 2004/0254890 | A1* | 12/2004 | Sancho | G07C 9/37 705/67 |
| 2015/0170135 | A1* | 6/2015 | Fourez | G06Q 20/40 705/21 |

* cited by examiner

*Primary Examiner* — Narayanswamy Subramanian
(74) *Attorney, Agent, or Firm* — Haynes and Boone, LLP

(57) ABSTRACT

A location of a transaction or payment request is compared with a location of a user device to determine whether the distance is great enough to send an alert for a possible fraudulent transaction. The user device location may be predicted based on a last known location and information about the area of the last known location and movement of the user device.

20 Claims, 7 Drawing Sheets

FRAUD ALERTING USING MOBILE PHONE LOCATION

CROSS REFERNCE TO RELATED APPLICATION

The present application is a Continuation of U.S. patent application Ser. No. 13/362,443, filed Jan. 31, 2012, entitled "FRAUD ALERTING USING MOBILE PHONE LOCATION", which in turn claims priority to U.S. Provisional Patent Application No. 61/441,623, filed Feb. 10, 2011, entitled "FRAUD ALERTING USING MOBILE PHONE LOCATION,", which are incorporated by reference in their entirety.

BACKGROUND

Credit card companies and merchants incur billions of dollars in losses each year from credit card fraud. Fraud is particularly high in the world of ecommerce where no credit card is actually presented for verification and the actual identity of the user performing the transaction is very difficult, if not impossible, to verify.

Some current fraud mitigation techniques are described below. One technique is for credit companies to request a cardholder's zip code and card CVV information to verify the identity of the cardholder. Unfortunately, most times when the card or the card number gets compromised, this information gets compromised along with it, thus reducing the efficacy of these additional pieces of info.

Another technique is for card companies to build detailed expensive models on card holder behaviors around purchase patterns (things they buy, stores they frequent, etc.) and geo movements (places the cardholder typically travels to). These behaviors are compiled over time and constantly evolve. The purchase models are used in detecting fraud early and alerting merchants and cardholders. However, the models take months if not years to be built for each user and often result in false positives when a user breaks their pattern.

In recent years, the sudden surge in flash commerce and hyper targeted marketing has resulted in user purchase patterns becoming more erratic and unpredictable. A "good deal" will make most people click "Buy" on items they otherwise would not have thought of buying. This shift in behavior often results in false negatives if the model is too rigid and renders the model useless approving all transactions if it is made too flexible. The current system results in higher fraud levels on one end and higher customer service costs and more customer dissatisfaction on the other.

Accordingly, it would be desirable to provide an improved method and system for electronic purchase fraud alerting.

SUMMARY

One embodiment provides methods and systems for credit card (or other online or electronic purchase) fraud alerting based on a user's location. Aspects of exemplary environment include using a location of a user's mobile device to obtain an indication of a location of the user; in response to receiving information regarding credit card or other transaction of the user, comparing the location of the user with a location of the credit card transaction; determining a likelihood of fraud in the credit card transaction based on a difference between the location of the user and the location of the transaction; and alerting at least one of the user and an issuer of the credit card when a likelihood of fraud has been determined.

In one embodiment, the location of the credit card transaction can include either a physical location of a merchant for in-store transaction or a geolocation of an IP address of a device used to conduct the transaction by the user or another purchaser during a web transaction. In different embodiments, the transaction need not be based on a credit card, but can be for an electronic payment using other payment provider services.

These and other features and advantages of the present disclosure will be more readily apparent from the detailed description of the embodiments set forth below.

Figure 1:
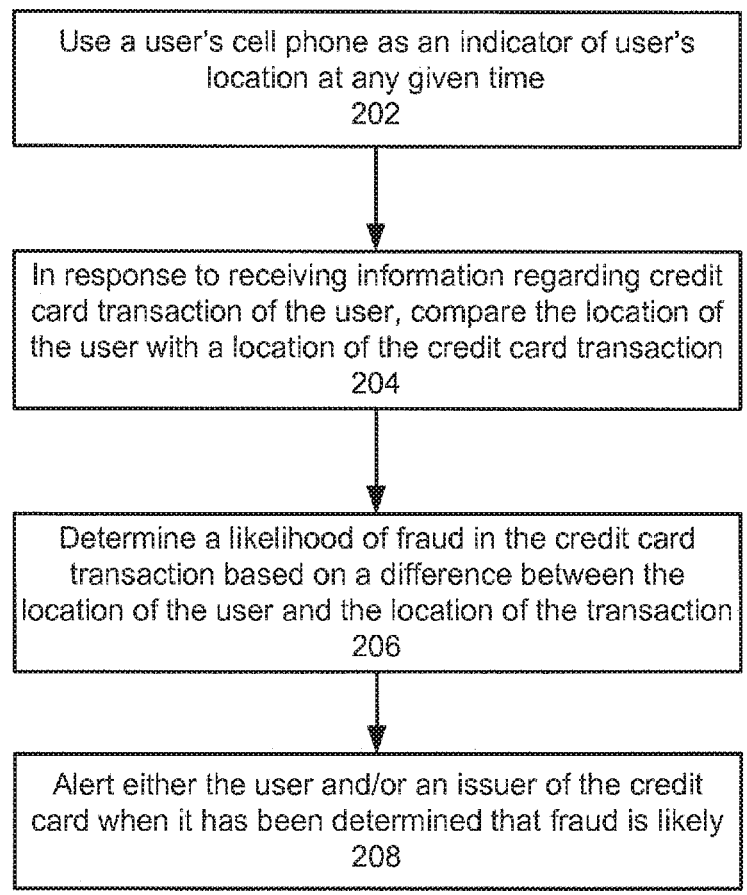
FIG. 1 is a flow diagram illustrating one environment of a process for credit card fraud alerting.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

One embodiment relates to credit card or other payment fraud alerting based on a user's location. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment," "one embodiment," and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

FIG. 1 is a flow diagram illustrating one environment of a process for credit card fraud alerting according to one embodiment. The exemplary embodiments recognize that location of a cardholder or authorized user is a critical piece of information that can alleviate significant amounts of fraud (as it is rare for a user to be too far from their cell phone). With the widespread adoption of mobile devices, such as a cell phone and more importantly smart phones, the exemplary embodiments use a user's cell phone as an indicator of the user's location at any given time (block 202). The location can be obtained through a location service, such as GPS service, in the phone.

The location of the user's cell phone may be obtained, in one embodiment, after a payment provider, such as PayPal, Inc. of San Jose, Calif., receives a payment request from a device. The payment request may be from a merchant or another user device, where the payment request includes information about the transaction, the seller or merchant location, an amount of the transaction. The location may be determined through a location service associated with the device from which the payment request is sent from or other means, such as a merchant ID associated with a merchant address stored in the payment provider database.

In response to receiving information regarding the payment request or credit card transaction of the user, the exemplary embodiments compare the location of the user (based on the location of the user's cell phone) with a location of the credit card transaction or payment request (based on the location of the payment request) (block 204).

A likelihood of fraud in the payment transaction is then determined based on a difference between the location of the user and the location of the transaction (block 206). This difference may vary, depending on system fraud requirements, user settings, accuracy or resolution of the location determinations, etc. For example, if the distance between the user device and the transaction device is more than 500 meters, a possible fraud may be identified.

When it has been determined that fraud is likely, either the user, the merchant/seller, and/or an issuer of the credit card can be alerted (block 208). The alert may be through a text, email, or call to the user device, the merchant, and/or the credit card issuer. In one embodiment, the user may be notified and be given the option of authorizing the payment, such as by verifying the user through an authentication or login flow with the payment provider through the user device.

The present solution utilizes the real time or last known location of a user's cell phone and compares it against the location of the credit card transaction to determine the propensity for fraud in a given transaction. The location of the user's mobile device (e.g., a cell phone, a watch phone, a PDA, a tablet computer, and the like) may be derived from an onboard GPS chip or via cell phone triangulation (depending on the device) and is sent up to server at regular intervals or when the device switches between cell towers for storage and analysis. This is done via software running on the device. This information is critical in getting up to date location on a user, and over time builds a detailed model for travel and location patterns.

The location of the credit card or payment transaction may include either a physical location of a merchant (e.g., a physical address of the merchant or an IP address of a point-of-sale (POS) terminal that is resolved to a geolocation), or a geolocation of an IP address of a device (e.g., a computer) used to execute the transaction by the user, merchant, or another purchaser.

Knowing the location of a user associated with the payment account or the cardholder and comparing it to the location of the transaction, both in the physical world (location of the point of sale terminal) or in an online world (geo IP location of the computer/device used in the transaction), at the time of the transaction can vastly improve decision making on the legitimacy of the transaction. Because a user is assumed to always be near or have in the user's possession the user's cell phone, the location of the cell phone is assumed to be the user's approximate location. Consequently, if a payment request is made by the user or on behalf of the user at a location far from the user's cell phone, the payment provider may assume a potential of a fraudulent payment request. This may not always be the case though, such as in the situation where the user left the cell phone at the house and went to the mall to make a purchase. In this case, the cell phone location may be far away from the payment request location, but still be a proper purchase request. In this case, the merchant may be notified and request additional authentication or verification from the user, such as a driver's license.

Figure 2:
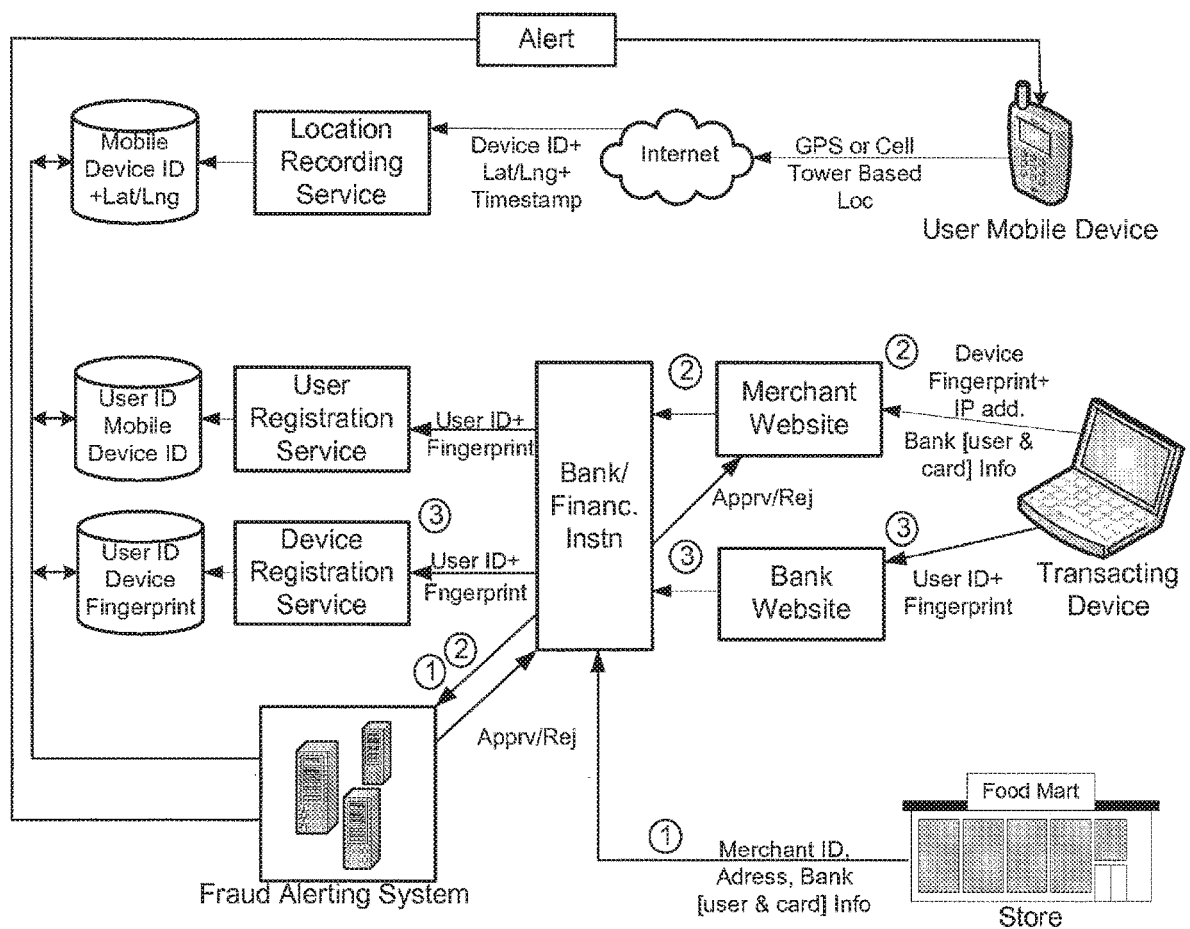
FIG. 2 is a diagram illustrating one embodiment of a credit card fraud alerting system.

FIG. 2 is a diagram illustrating one embodiment of a credit card fraud alerting system. Note that while the descriptions herein describe primarily an alert based on a credit card transaction, the alert may apply to other payment requests, such as with a debit card, an online payment provider service, a check, etc. The fraud alerting system uses the location of the user's mobile device and the computer used in the transaction to determine credit card fraud in the following scenarios:

In store purchases: When a user swipes a credit card at a store to pay for goods/services, the physical location of the merchant/service provider is sent the bank/financial institution/payment provider and onto a server in the fraud alerting system where the physical location of the merchant/service provider is compared against the last known location of the user's cell phone in real-time. If the last known location as beaconed by the mobile device is recent and the distance between the mobile device and the merchant address is significant, an alert may be generated and sent to the mobile phone and/or the transaction may be pushed into a review queue or rejected.

Each merchant terminal contains a terminal ID and has a designated merchant address that is part of the transaction. At the time of the transaction, this terminal address is geo coded into a latitude /longitude (lat/long). The lat/long of the transaction is then compared to the last known mobile device location. The device location may be aged on an exponential scale ($1/\log(n)$), so information that is current (recent) results in a high confidence; however location information that is hours or days old bears almost no confidence since the user may have moved. Confidence may be assigned by $1/(\text{Log}(\text{current time}-\text{time of last location recording})+1)$. If the confidence is low, the system may attempt to obtain a current location of the user and/or user mobile device/cell phone.

The distance between the transaction location and the last known mobile phone location may be computed to determine the likelihood of the cardholder being present at the POS terminal. When a recent location for the device is unknown, the user location may be predicted as described below.

With a web purchase from a merchant website or app, the IP address or device ID of the browser/transacting device may be used to determine the location of the transaction. The fraud alerting system then compares the transaction location to the mobile device location to determine whether the mobile phone is within reasonable distance of the transacting device. A significant distance results in an alert and/or a rejection of the transaction.

At the time of the transaction, the transaction device (such as a user computer, a merchant terminal/server) IP address is captured and passed through with the transaction parameters. The IP address is then resolved to a geo location. The geo location of the transaction device (e.g., the user's computer) is then compared with the last known location of the mobile device associated with the account. Any distances over a threshold number of miles may result in a flag and/or alert.

Geo IP accuracy can vary from vendor to vendor. Poor accuracy in IP geo-location data can result in locating the transaction in wrong counties, wrong cities, or even states. In order to improve confidence and accuracy, the fraud alerting system service may pull the IP geo location information across multiple providers and cluster the locations based on distances from each other. In many cases, a simple majority rule should suffice in determining which location is correct; however clustering the locations from various providers and then using the size of the largest cluster to determine a confidence in the location is an approach that has proven most effective.

Furthermore with the advent of HTML 5, geo standards and modern browsers allowing users to geolocate themselves (using WIFI triangulation), it is possible to use data submitted by end users to score various IP geo data vendors for accuracy. This scoring for accuracy is then used in determining the weight or trust value to be assigned to the specific vendor for future IP geo lookups. This scoring is further refined by using characteristics of the IP address such as routing type, assignment, city, state, organization etc., to determine how specific vendors perform across each of these dimensions. For example, vendor A might perform very well (based on user submitted data) when the organization field is set or when the country for the IP address is UK and perform poorly when the connection type is DSL or dialup.

This is significant because a fraudster gaining access to a user's credit card or the digits of the card will also need to be in possession of the user's cell phone. If the cell phone is not within the same geo boundary, the transaction will result in the cardholder being alerted and/or the transaction being put in a review queue.

The fraud alerting system enables consumers to link specific devices to their payment account and only transactions originating from those devices are permitted to carry out transactions using the specific payment account. All other transactions result in alerts sent to the user's mobile device and/or end up in review queues.

When a new device is seen by the fraud alerting system, the device is fingerprinted using parameters unique to the device, including operating system, screen resolution, browser info, plug-in, extension DLLs, IP geo location, etc. A device ID is a unique identifier that enables the fraud alerting system servers to identify the device even if the user decides to delete all cookies and shared objects that may be written into the browser's cache by the fraud alerting system servers. In one embodiment, the device ID comprises of two pieces: 1) a unique hash of various parameters identifying the user's computer system, and 2) a randomly generated ID that is guaranteed to be unique for very unlikely cases where two devices use the exact same system configuration.

The device ID is written to the browser's cookie store but is also maintained on the fraud alerting system along with the computer's IP address. Keeping a copy of the fingerprint on the server allows the system to query the fingerprint given the device parameters and the IP address even if the user accidentally or intentionally deletes all their cookies.

User's logging into a bank's website/app, payment provider website/app, or their credit card provider's website/app can add specific devices to their "authorized list." When the user authorizes a computer, the fingerprint of the computer is saved in a secure digital locker, and added to the user's access list.

Figure 3:
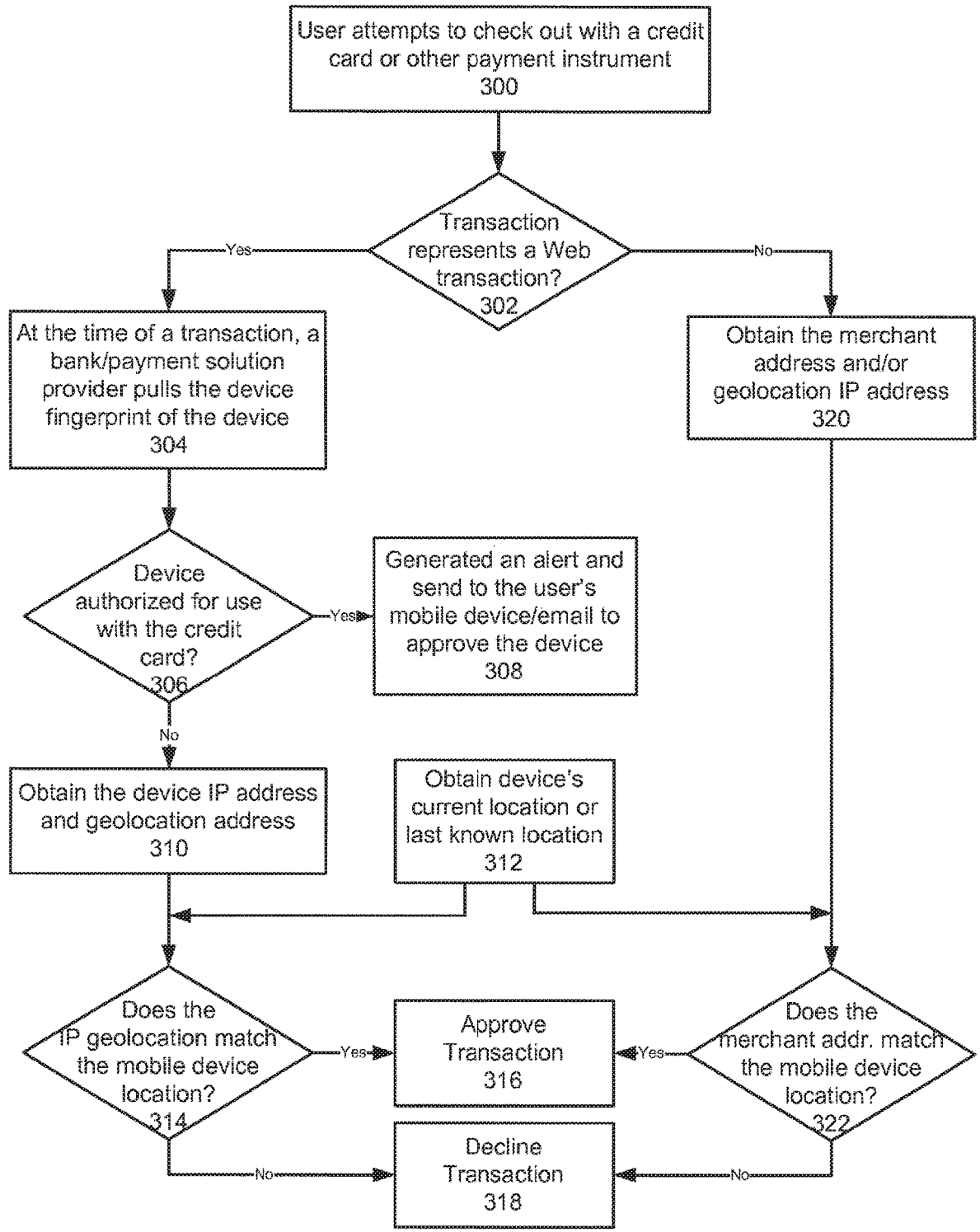
FIG. 3 is a diagram illustrating a process for credit card fraud alerting in accordance with an exemplary embodiment.

FIG. 3 is a diagram illustrating a process for credit card fraud alerting in accordance with an exemplary embodiment. The process may begin with the user attempting to check out with a credit card or other payment instrument, such as PayPal™ (block 300). It is then determined whether the transaction represents a Web transaction (block 302) or other transaction through a computing device, such as through a mobile app. If it is determined to be a Web (or app) transaction, then at the time of a transaction, a bank/payment solution provider may pull the device fingerprint of the device, such as the user's home or work PC, on which the transaction is being performed (block 304).

It is then determined if the transaction device is authorized for use with the credit card or payment instrument (block 306). This may be done by checking the fingerprint against the user's authorized access list and digital locker to establish trust with the device. If the transaction device is not on the authorization access list, an alert is generated and sent to the user's mobile device/email to approve the device (block 308). This may be carried out in real time or may be sent asynchronously requesting authorization within a certain number of hours or days. The user may revoke authority from a device at any given time by simply accessing their digital locker either via their mobile phone or via the web and removing the device fingerprint of the device in question (e.g., when the device is lost, broken, or stolen).

If the device is authorized for a given credit card or payment system, the device IP address and geolocation address are obtained (block 310). The mobile device's current location or last known location is also obtained (block 312). The IP geolocation and the mobile device location are then compared to determine if they match within a predefined distance threshold (block 314). If so, the transaction is approved (block 316), assuming other conditions are met, such as a successful user login. If not, the transaction may be declined and/or an alert generated and sent (block 318).

If the transaction is determined not to be a Web (or app) transaction, the merchant address and/or the merchant geo IP address are obtained (block 320). The mobile device's current location or last known location is also obtained (block 312). It is then determined if the merchant address matches the mobile device location within a predefined distance threshold (block 322). If so, the transaction is approved (block 316). If not, the transaction may be declined and/or an alert generated and sent (block 318).

Knowing where a person is at any given time has many applications. Some of the applications could include locality specific advertising, social networking (showing where friends might be on a map) and in fraud mitigation. If the cell phone location could be queried continuously or if the cell phone proactively reports its location in a frequent periodic fashion, there may be no need for any further optimizations.

Unfortunately, getting the location of a cell phone may not always be possible. For example, doing so may result in the loss of battery power quickly. Also, phones may be powered off during flights, in cinemas, during meetings, night time, to save power, etc., and phones often enter zones with limited/ no connectivity.

When a cell phone location is unavailable, there may be methods to predict a possible set of locations of a user. In one method, heuristics are used. Based on previous geo movement patterns/locations for specific times of day, days of week, and days of the year, the fraud alerting system can build patterns in geo movement across time. If at any time the cell phone location cannot be extracted, it can be computed based on last known location, a heading, velocity of travel (computed based on last known geo locations in a given travel segment) and a match to previous geo movement patterns.

In another method, the last known location is used. The last known location information can be quite valuable in computing possible new locations for a person. The presence of a high speed rail, ferry service or airport can aid in creating a geo fence for the user's location even when the location information is no longer available from a mobile device. For example, if the last location is near (within 5 miles) an airport, the fraud alerting system can compute a potential area (circle around last location) where the user could be after a certain amount of elapsed time. This circle of presence could be further augmented by pulling in airline departure information, average aircraft speeds, and flight departure and destination list. The rate of change of radius of the circle (geofence) is tightly correlated with specific information related to the last known location (was it an airport, high speed rail terminal, bus station, etc.)/available options for travel, previous heading and potential velocity information.

In a fraud mitigation application, building regular patterns of travel can significantly aid in locating the user. Furthermore, when a person is located near an international airport and then transactions appear from an international location after many hours, it is possible to compute the possibility of whether a person may actually be at the international location. This information is extremely valuable, especially in authorizing international credit card or payment transactions if it is possible that the authorized user may have travelled internationally. On the flip side, if the last known location for a person puts the transaction outside a geo fence given a certain amount of elapsed time, then the transaction may be instantly declined or at least flagged for follow up or additional analysis.

Figure 4:
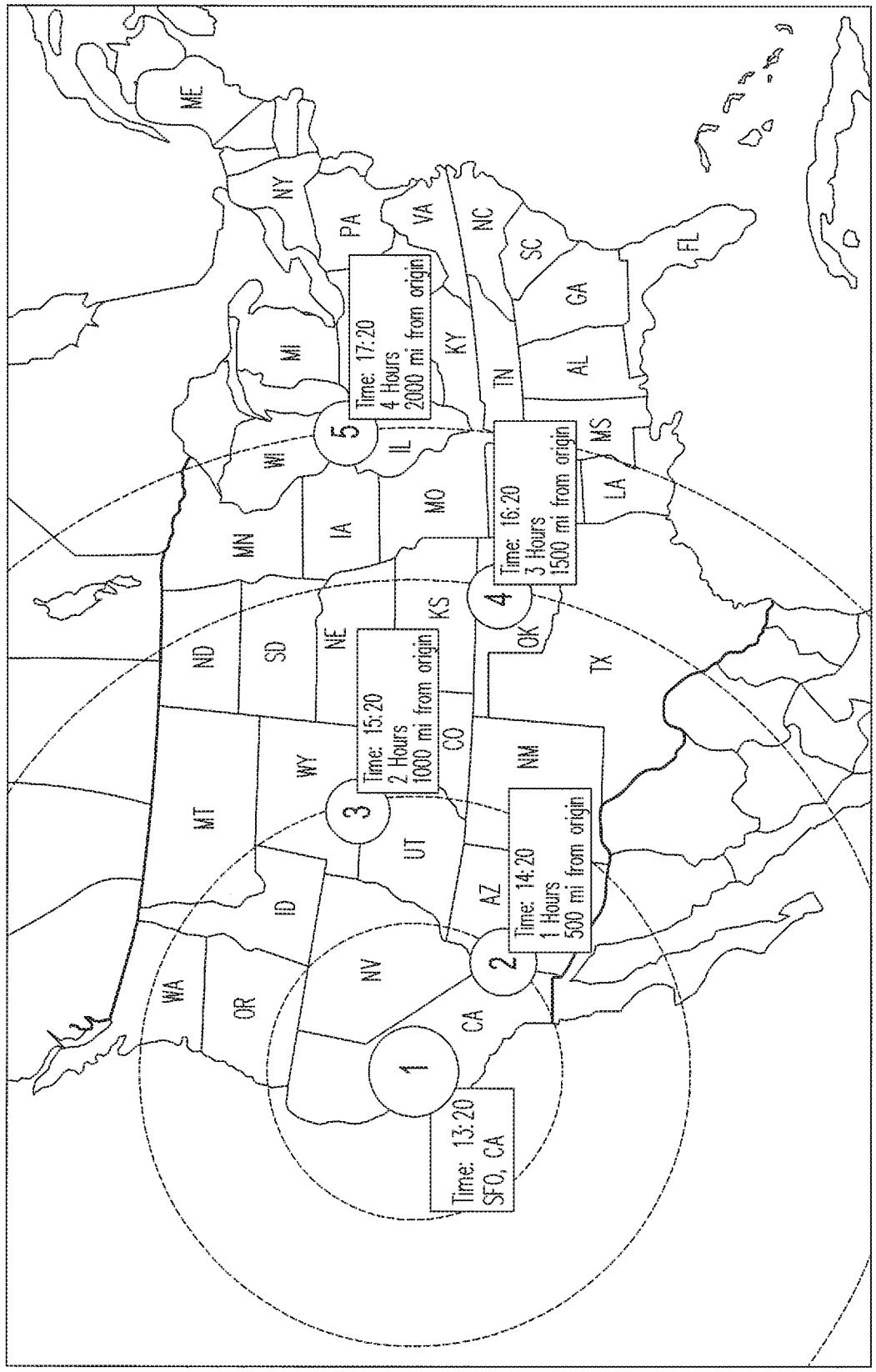
FIG. 4 is a diagram of an example graphically illustrating computing the possibility of a person being at a particular location given the last location near an airport.

FIG. 4 is a diagram of an example graphically illustrating computing the possibility of a person being at a particular location given the last location near an airport. A map of the United States is shown and regions enclosed in each of the circles is where the user could potentially be after an increasing number of hours after the last geo update from their cell phone. The illustration builds on the specific case where the person was last spotted within a few miles of San Francisco International Airport (SFO). It considers time of day, departing flights around that time, average commercial flight speed, FAA flight records for public and private flights and potential destinations.

Figure 5:
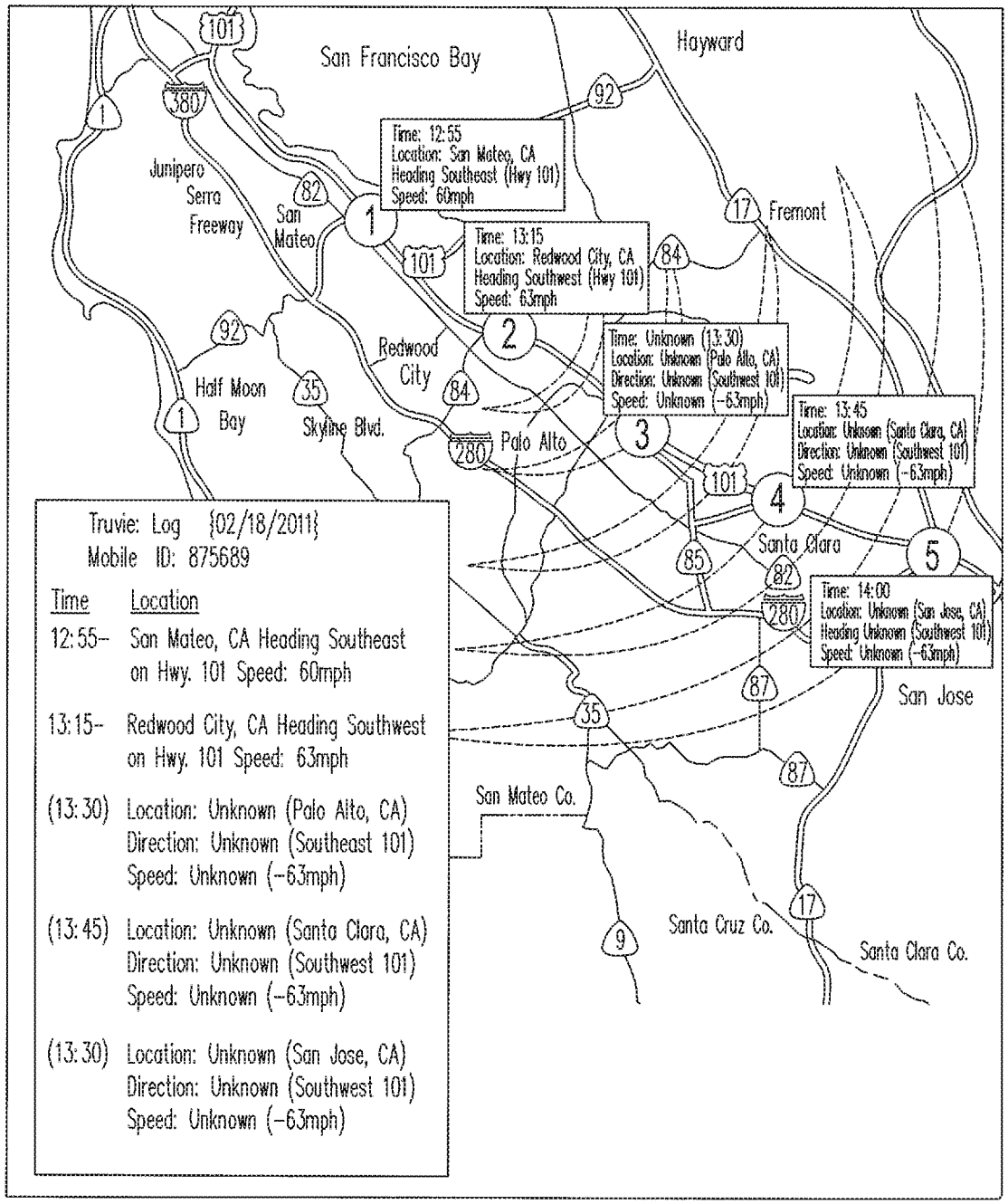
FIG. 5 is a diagram showing the area around SFO in more detail and the last known set of positions of the user (based on cell phone location)

FIG. 5 is a diagram showing the area around SFO in more detail and the last known set of positions of the user (based on cell phone location). In one embodiment, a predictive model can be created for a user's position at times when there is no cell phone location reported back to the fraud alerting system. The last known locations are shown in positions 1 and 2. The time, location, heading and speed are known. At positions 3, 4, and 5, the cell phone location is unknown (perhaps it ran out of batteries). Based on the information collected at positions 1 and 2, a trajectory along the route can be calculated to predict the user's position at a given time at positions 3,4, and 5.

As such, even when a recent or real-time cell phone location cannot be obtained, the system may still be able to predict location(s) with enough certainty to allow the system to issue a fraud alert, as described herein, based on the transaction or transaction device location and a predicted user cell phone location.

Figure 6:
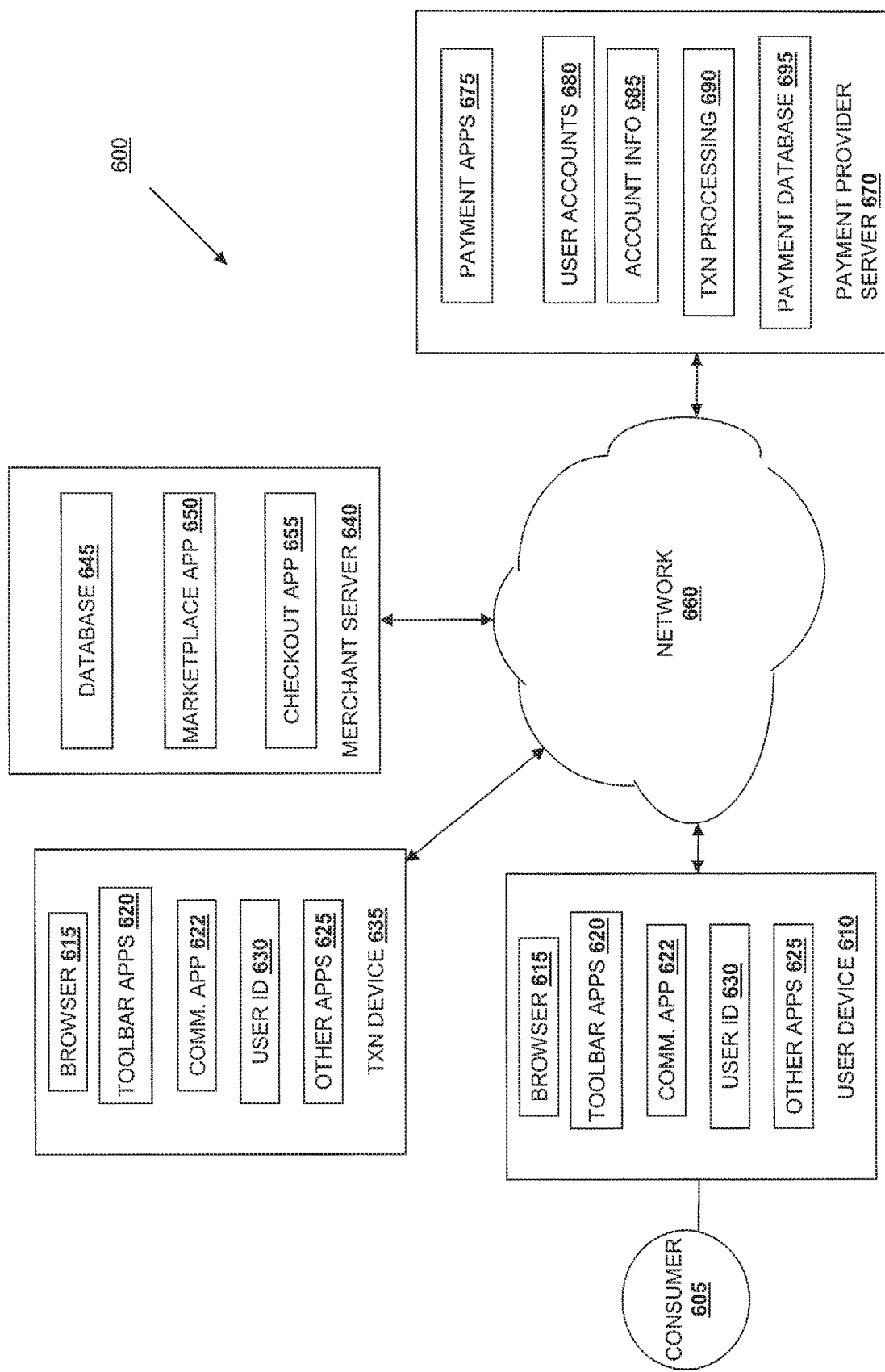
FIG. 6 is a block diagram of a networked system suitable for implementing the processes described herein according to an embodiment.

FIG. 6 is a block diagram of a networked system 600 configured to process a financial transaction or payment request between a payment recipient (e.g., merchant) and a payment sender (e.g., user or consumer), such as described above, in accordance with an embodiment of the invention. System 600 includes a user device 610, a transaction device 635, a merchant server 640, and a payment provider server 670 in communication over a network 660. Payment provider server 670 may be maintained by a payment provider, such as PayPal, Inc. of San Jose, Calif., a credit card company, a bank, etc. A user 605, such as the sender or consumer, can utilize user device 610 (or transaction device 635) to perform a payment transaction with merchant server 640 using payment provider server 670 or to convey a desire to make a payment through the payment provider so that the payment provider may process the payment request and approve or deny the request.

User device 610, transaction device 635, merchant server 640, and payment provider server 670 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

Network 660 may be implemented as a single network or a combination of multiple networks. For example, in various embodiments, network 660 may include the Internet or one or more intranets, landline networks, wireless networks, and/or other appropriate types of networks.

User device 610 may be implemented using any appropriate hardware and software configured for wired and/or wireless communication over network 660. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 610 may include one or more browser applications 615 which may be used, for example, to provide a convenient interface to permit user 605 to browse information available over network 660. For example, in one embodiment, browser application 615 may be implemented as a web or mobile browser configured to view information available over the Internet. User device 610 may also include one or more toolbar applications 620 which may be used, for example, to provide client-side processing for performing desired tasks in response to operations selected by user 605. In one embodiment, toolbar application 620 may display a user interface in connection with browser application 615.

User device 610 may further include other applications 625 as may be desired in particular embodiments to provide desired features to user device 610. For example, other applications 625 may include security applications for implementing client-side security features, programmatic client applications for interfacing with appropriate application programming interfaces (APIs) over network 660, or other types of applications. Applications 625 may also include email, texting, voice and IM applications that allow user 605 to send and receive emails, calls, and texts through network 660, as well as applications that enable the user to communicate, place orders, make payments, and change payment options through the payment provider. User device 610 includes one or more user identifiers 630 which may be implemented, for example, as operating system registry entries, cookies associated with browser application 615, identifiers associated with hardware of user device 610, or other appropriate identifiers, such as used for payment/user/device authentication. In one embodiment, user identifier 630 may be used by a payment service provider to associate user 605 with a particular account maintained by the payment provider as further described herein. A communications application 622, with associated interfaces, enables user device 610 to communicate within system 600, such as via a cell phone network. Communications application 622 may also include a GPS service or other location service that enables the location of user device 610 to be determined by payment provider server 670. Note that in different embodiments, user device 610 may be a simple cell phone with includes, at a minimum, a location determining application and may not require some the applications and capabilities above.

Transaction device 635 may be the same or similar to user device 610 as described above. In one embodiment, user device 610 is a cell phone or smart phone, while transaction device is a PC or merchant terminal (such as a POS). Transaction device 635 may be the device that transmits a payment request to the payment provider on behalf of the user.

Merchant server 640 may be maintained, for example, by a merchant or seller offering various products and/or services in exchange for payment to be received over network 660. Generally, merchant server 640 may be maintained by anyone or any entity that receives money, which includes charities as well as retailers and restaurants. Merchant server 640 includes a database 645 identifying available products and/or services (e.g., collectively referred to as items) which may be made available for viewing and purchase by user 605. Merchant server 640 also includes a marketplace application 650 which may be configured to serve information over network 660 to browser 615 of user device 610. In one embodiment, user 605 may interact, either through user device 610 or transaction device 635, with marketplace application 650 through browser applications over network 660 in order to view various products, food items, or services identified in database 645. Merchant server 640 may also communicate directly with transaction device 635, such as when transaction device is a merchant terminal.

Merchant server 640 also includes a checkout application 655 which may be configured to facilitate the purchase by user 605 of goods or services identified by marketplace application 650. Checkout application 655 may be configured to accept payment information from or on behalf of user 605 through payment service provider server 670 over network 660. For example, checkout application 655 may receive and process a payment confirmation or payment options from payment service provider server 670, as well as transmit transaction information to the payment provider and receive information from the payment provider, including fraud alerts as described herein.

Payment provider server 670 may be maintained, for example, by an online payment service provider, credit card company, or bank, which may provide payment between user 605 and the operator of merchant server 640. In this regard, payment provider server 670 includes one or more payment applications 675 which may be configured to interact with user device 610, transaction device 635, and/or merchant server 640 over network 660 to facilitate the purchase of goods or services by user 605 through user device 610 or transaction device 635.

Payment provider server 670 also maintains a plurality of user accounts 680, each of which may include account information 685 associated with individual users. For example, account information 685 may include private financial information of users of devices such as account numbers, passwords, device identifiers, user names, phone numbers, credit card information, bank information, or other financial information which may be used to facilitate online transactions by user 605. Advantageously, payment application 675 may be configured to interact with merchant server 640 and/or transaction device 635 on behalf of user 605 during a transaction with checkout application 655 to track and manage payment requests from the user. User accounts may also contain information about one or more devices associated with the user and the user account, such as a device ID, IP address, current location of device, history of device locations, and other information about device location as described herein, such as direction of movement.

A transaction processing application 690, which may be part of payment application 675 or separate, may be configured to receive information from a user device, transaction device and/or merchant server 640 for processing and storage in a payment database 695. Transaction processing application 690 may include one or more applications to process information from user 605 for processing a payment request or one or more locations of user device 610, transaction device 635, and/or merchant server 670. As such, transaction processing application 390 may store details of a payment request, including merchant location and device locations to determine a possible fraud alert for the transaction. Payment application 675 may be further configured to determine the existence of and to manage accounts for user 605, as well as create new accounts if necessary.

Payment database 695 may store transaction details from completed transactions, including location of the transaction and user device. Such information may also be stored in a third party database accessible by the payment provider and/or the merchant.

Figure 7:
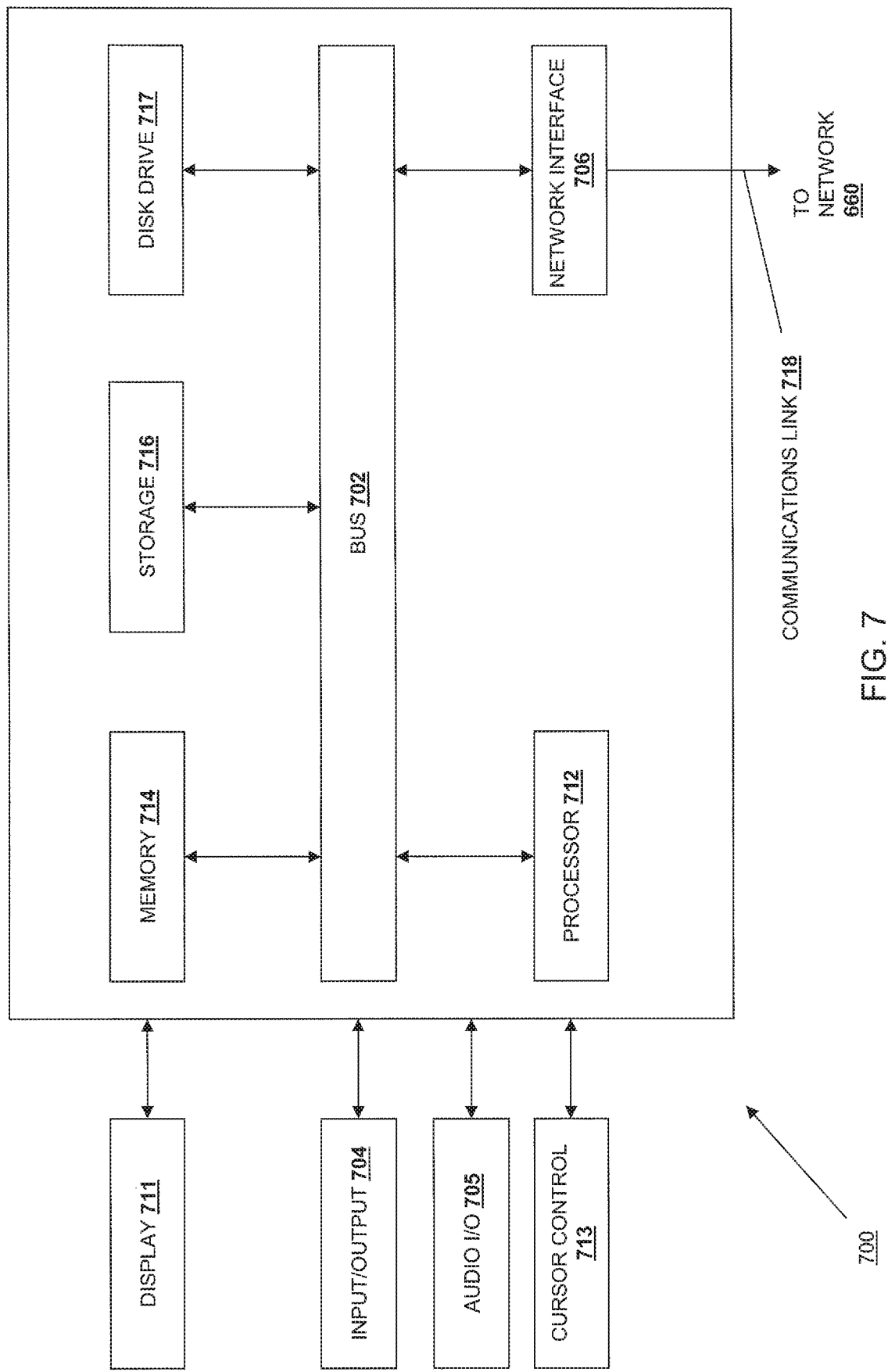
FIG. 7 is a block diagram of a computer system suitable for implementing one or more components in FIG. 6 according to one embodiment of the present disclosure.

FIG. 7 is a block diagram of a computer system 700 suitable for implementing one or more embodiments of the present disclosure. In various implementations, the user device may comprise a personal computing device (e.g., a personal computer, laptop, smart phone, tablet, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another user device, a merchant server, or a payment provider server via network 760. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices. A GPS chip may be part of or separate from processor 712 to enable the location of computer system 700 to be determined.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

I claim:

1. A system, comprising:
one or more hardware processors; and
a memory storing computer-executable instructions, that in response to execution by the one or more hardware processors, causes the system to perform operations comprising:
receiving a first payment request corresponding to a transaction between a merchant and a user, the first payment request indicating a payment instrument to be used for payment;
calculating a digital fingerprint corresponding to a transaction device associated with the user by generating a hash value based on system configuration information associated with the transaction device, wherein the system configuration information comprises information associated with at least one of an operating system, a screen resolution, a web browser, a plug-in, a browser extension, a software library, an Internet Protocol address, and a geolocation;
determining that the transaction device is not authorized to use the payment instrument by accessing a database to determine whether the database stores an association between the payment instrument and the digital fingerprint;
in response to the determining that the transaction device is not authorized, determining a location of the transaction device based on clustering network geolocation information from a plurality of network geolocation vendors;
determining a location of a mobile device associated with the user; and determining whether to approve the transaction based on a distance between the location of the transaction device and the location of the mobile device.

2. The system of claim 1, wherein the determining whether to approve the transaction further comprises:
determining that the distance is greater than a predetermined distance threshold.

3. The system of claim 2, wherein the operations further comprise:
in response to the determining that the distance is greater than the predetermined distance threshold, declining the transaction.

4. The system of claim 2, wherein the operations further comprise:
in response to the determining that the distance is greater than the predetermined distance threshold, transmitting a request for additional authentication information.

5. The system of claim 1, wherein the operations further comprise:
determining that the distance is less than or equal to a predetermined distance threshold; and
approving the transaction.

6. The system of claim 1, wherein the network geolocation information comprises a plurality of associations between Internet Protocol (IP) address and geolocations.

7. The system of claim 1, wherein the determining the location of the transaction device further comprises:
determining a set of network geolocation clusters based on the network geolocation information;
identifying a first network geolocation cluster from the set of network geolocation clusters, the first network geolocation cluster being larger than any other cluster in the set of network geolocation clusters; and
calculating, based on a size of the first network geolocation cluster, a confidence level in a first location represented by the first network geolocation cluster.

8. The system of claim 1, wherein the operations further comprise:
subsequent to receiving a second payment request, generating a second hash value for a second transaction device based on second system configuration information associated with the second transaction device, wherein the second system configuration information is the same as the system configuration information associated with the transaction device, and wherein the second hash value is different than the hash value generated for the transaction device.

9. A method, comprising:
receiving, by a system comprising one or more hardware processors, a first payment request to use a payment instrument for a transaction between a transaction device associated with a user account and a merchant server associated with a merchant;
calculating a digital fingerprint corresponding to the transaction device by generating a hash value based on system configuration information associated with the transaction device, wherein the system configuration information comprises information associated with at least one of an operating system, a screen resolution, a web browser, a plug-in, a browser extension, a software library, an Internet Protocol address, and a geolocation;
determining that the transaction device is not authorized to use the payment instrument by accessing a database to determine whether the database stores an association between the payment instrument and the digital fingerprint;

in response to the determining that the transaction device is not authorized, determining a location of the transaction device based on network geolocation information corresponding to the transaction device;
determining a location of a mobile device associated with the user account; and
determining whether to approve the transaction based on a distance between the location of the transaction device and the location of the mobile device.

10. The method of claim 9, wherein the determining whether to approve the transaction further comprises:
determining whether the distance is greater than a predetermined distance threshold.

11. The method of claim 10, further comprising:
in response to determining that the distance is greater than the predetermined distance threshold, generating an alert for potential fraud.

12. The method of claim 9, wherein the calculating the digital fingerprint further comprises:
generating a hash value based on system configuration information associated with the transaction device, the system configuration information comprising information associated with at least one of an operating system, a screen resolution, a web browser, a plug-in, a browser extension, a software library, an Internet Protocol address, and a geolocation.

13. The method of claim 9, wherein the determining the location of the transaction device further comprises:
determining a set of network geolocation clusters based on the network geolocation information;
identifying a first network geolocation cluster from the set of network geolocation clusters, the first network geolocation cluster being larger than any other cluster in the set of network geolocation clusters; and
calculating, based on a size of the first network geolocation cluster, a confidence level in a first location represented by the first network geolocation cluster.

14. The method of claim 9, wherein the network geolocation information comprises a plurality of associations between Internet Protocol (IP) address and geolocations.

15. The method of claim 9, further comprising:
subsequent to receiving a second payment request, generating a second hash value for a second transaction device based on second system configuration information associated with the second transaction device, wherein the second system configuration information is the same as the system configuration information associated with the transaction device, and wherein the second hash value is different than the hash value generated for the transaction device.

16. A non-transitory computer readable medium storing computer-executable instructions that in response to execution by one or more hardware processors, causes a service provider system to perform operations comprising:
receiving a first payment request to use a payment instrument for a transaction between a transaction device associated with a user account and a merchant server associated with a merchant;
calculating a digital fingerprint corresponding to the transaction device by generating a hash value based on system configuration information associated with the transaction device, wherein the system configuration information comprises information associated with at least one of an operating system, a screen resolution, a web browser, a plug-in, a browser extension, a software library, an Internet Protocol address, and a geolocation;

determining that the transaction device is not authorized to use the payment instrument by accessing a database to determine whether the database stores an association between the payment instrument and the digital fingerprint;

in response to the determining that the transaction device is not authorized, determining a location of the transaction device based on network geolocation information corresponding to the transaction device;

determining a location of a mobile device associated with the user account; and determining whether to approve the transaction based on a distance between the location of the transaction device and the location of the mobile device.

17. The non-transitory computer readable medium of claim 16, wherein the operations further comprise:

in response to determining that the distance is greater than a predetermined distance threshold, generating an alert for potential fraud.

18. The non-transitory computer readable medium of claim 16, wherein the operations further comprise:

subsequent to receiving a second payment request, generating a second hash value for a second transaction device based on second system configuration information associated with the second transaction device, wherein the second system configuration information is the same as the system configuration information associated with the transaction device, and wherein the second hash value is different than the hash value generated for the transaction device.

19. The non-transitory computer readable medium of claim 16, wherein the operations further comprise:

in response to the determining that the distance is greater than a predetermined distance threshold, declining the transaction.

20. The non-transitory computer readable medium of claim 16, wherein the operations further comprise:

determining that the distance is less than or equal to a predetermined distance threshold; and approving the transaction.

\* \* \* \* \*